No. 47,907.  
A. A. WILSON.  
COUPLING SHAFTS OF BORING TOOLS.  
PATENTED MAY 23, 1865.
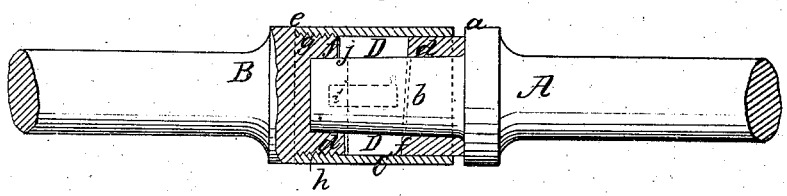
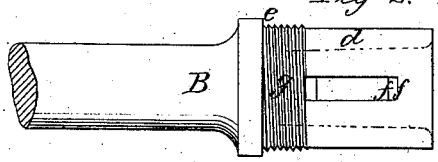 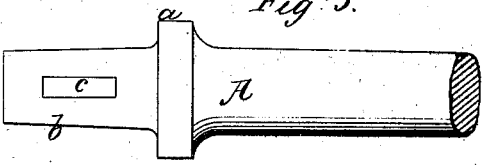
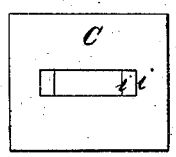 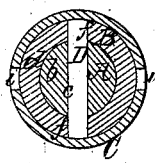 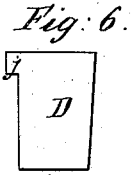
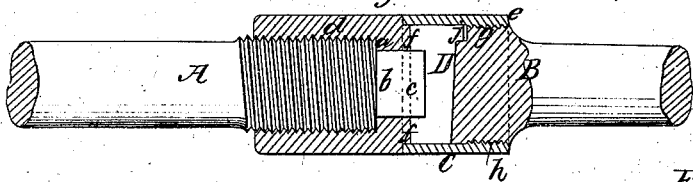
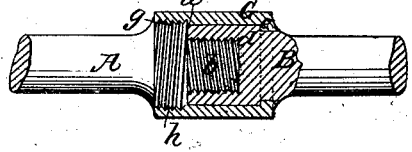
Witnesses;  
R. J. Campbell  
E. Schafer
Inventor;  
Albert Augustus Wilson  
Per  
Mason, Fenwick & Lawrence  
Atty.

UNITED STATES PATENT OFFICE.

ALBERT AUGUSTUS WILSON, OF GREEN POINT, NEW YORK, ASSIGNOR TO HIMSELF AND HOFFMAN ATKINSON, OF ROUSEVILLE, PA.

COUPLING SHAFTS OF BORING-TOOLS.

Specification forming part of Letters Patent No. 47,907, dated May 23, 1865.

*To all whom it may concern:*

Be it known that I, ALBERT AUGUSTUS WILSON, of Green Point, in the county of Kings and State of New York, have invented a new and useful improvement in securing the joints of stems or shafts of tools used in boring Artesian wells; and I do hereby declare that the following is a full, clear, and exact description of the same, reference being had to the accompanying drawings, forming part of this specification, in which—

Figure 1 is a longitudinal section of a joint formed and secured in accordance with my invention. Figs. 2, 3, and 4 are elevations of three of the elements shown in Fig. 1 as they appear separated. Fig. 5 is a cross-section of the parts as they appear when keyed together in the manner shown in Fig. 1. Fig. 6 is an elevation of the key. Figs. 7 and 8 are different modes for effecting a coupling between the ends of the parts of a shaft used in boring wells.

Similar letters of reference in the several figures indicate corresponding parts.

The nature of my invention consists in providing a sleeve in connection with any two parts of the stem or shaft of tools used in boring or drilling Artesian wells, and arranging the same, in combination with a key, in such manner that the joint formed between said parts is rendered secure, and a disconnection of one part from another accidentally is prevented.

To enable others skilled in the art to make and use my invention, I will proceed to describe the same with reference to the drawings.

A, Figs. 1, 3, and 5, represents one part of a boring or cutting tool stem or shaft, and B, Figs. 1, 2, and 5, is another part thereof. These parts are constructed at one of their respective ends so as to couple together, as represented. The part A is formed with a shoulder, $a$, and from said shoulder a cylindric or conic stem, $b$, extends, as shown, and through this stem a taper slot, $c$, is cut. The part B is formed with an enlarged socket-extension, $d$, which may be described as a tubular stem, extending from a shoulder, $e$, of the part B, as represented, and through this tubular stem a slot, $f$, of taper form, is cut. From the slot $f$ to the shoulder $e$ a screw-thread, $g$, is formed on the circumference of the tubular stem, as shown.

C is a cylindric sleeve furnished on its circumference, internally, with a screw-thread, $h$, of just the length of the screw-thread $g$ of the tubular stem $d$. This sleeve fits over the extension $d$, and is held in place by its screw-thread taking hold of the screw-thread $g$. Through this sleeve a taper slot, $i$, is cut. The slots which are cut through the respective parts A B C form, when all are in line, one continuous taper passage through the said parts—that is, when the parts are put together and ready to be keyed. The stem $b$ of the part A is cylindric, and just fits the bore of the tubular stem $d$, as shown.

D is a taper key, of a length just equal to the greatest diameter of the tubular extension $d$, and of a width and breadth corresponding with the taper slots through the parts A B C. This key has a shoulder, $j$, formed on it at one of its upper corners, and in order to accommodate this shoulder or ledge the upper part of the slot $f$ is made longer than the slot in the stem $b$, and a like extension of the upper part of the slot $i$ in the sleeve C is made so as to admit the ledge through it, as will be evident from the drawings. By thus constructing the key and the passage or seat for it, it just reaches through the two stems $b$ $d$, and its ends are just flush with the outer circumference of the tubular stem $d$, in which condition it is held by means of the ledge $j$, and kept from binding upon the inner circumference of the sleeve C.

To connect the parts A B and prevent their separation, except at the will of the manager of the boring operation, the sleeve C is partly screwed upon the tubular stem $d$, so as to have the slots in both the stem $d$ and the sleeve in proper relation to, or register with, one another. The stem $b$ is next inserted into the socket of the tubular stem $d$ to such an extent that its shoulder $a$ comes in contact with the outer ends of both the sleeve and the tubular stem, and its slot registers with the slots of the stem $d$ and sleeve C. When the parts are thus put together, there is a space between the screwed end of the sleeve and the shoulder $e$ similar to the space which is represented as existing between shoulder $a$ and open end of the sleeve C. The parts being in this con dition, the key D is driven into the slots of the sleeve and stems *b d* until its ends are just flush with the outer circumference of the stem *d*. At this stage the sleeve C is screwed up against the shoulder *e*, as represented in Fig. 1. The screwing up of the sleeve causes the slot *i* therein to move out of register with the key both longitudinally and transversely, as will be evident from Figs. 1 and 5 of the drawings. In Fig. 1 the position of the slot of the sleeve with respect to the ends of the key is shown by dotted lines. The joint thus made and secured cannot readily disconnect by reason of jarring or back-turning of the screw-coupling, as it is a matter of nice adjustment to bring the slots of the respective parts in proper register for withdrawing the key, and, besides this, several revolutions of the sleeve must occur before the key can leave its seat.

In Fig. 7 the stem *b* is screw-threaded for a portion of its length, and in the end of the portion which is plain a slot is cut. In other respects the construction is in effect the same as that shown in Fig. 1. The key D in this construction prevents the stem *b* from unscrewing.

In Fig. 8 the sleeve C is shown as applied to a stem, *b*, on which a right-hand and a left-hand screw-thread is cut. With this construction any tendency of the parts to unscrew in one direction is counteracted by the parts being screwed up in a reverse direction. Thus a separation cannot take place.

I have shown the special constructions, Figs. 7 and 8, only for the purpose of showing how otherwise the shafts might be coupled together and not with a view of claiming the same under this patent. I intend, however, to apply for separate patents upon these special modes at some future time.

What I claim as my invention, and desire to secure by Letters Patent, is—

1. Providing the sleeve in connection with any two parts of the stem or shaft of tools, and arranging the same in combination with the key, substantially as and for the purpose described.

2. The combination of the screw-thread *g*, shoulder *e*, shoulder *a*, and sleeve C, in the construction of the coupling ends of well-borer shafts or stems, substantially as and for the purpose herein described.

ALBERT AUGUSTUS WILSON.

Witnesses:
R. T. CAMPBELL,
E. SCHAFER.